(12) United States Patent
Dames (10) Patent No.: US 7,389,016 B2
(45) Date of Patent: Jun. 17, 2008

(54) BEAM STEERING OPTICAL SWITCH

(75) Inventor: Andrew Nicholas Dames, Cambridge (GB)

(73) Assignee: Polatis Ltd., Cambridge (GB)

( * ) Notice: Subject to any disclaimer, the term of this patent is extended or adjusted under 35 U.S.C. 154(b) by 79 days.

(21) Appl. No.: 10/561,403

(22) PCT Filed: Jun. 18, 2004

(86) PCT No.: PCT/GB2004/002633

§ 371 (c)(1),
(2), (4) Date: Dec. 16, 2005

(87) PCT Pub. No.: WO2004/113980

PCT Pub. Date: Dec. 29, 2004

(65) Prior Publication Data

US 2007/0091484 A1     Apr. 26, 2007

(30) Foreign Application Priority Data

Jun. 19, 2003   (GB)   ................................. 0314217.1

(51) Int. Cl.
*G02B 6/26*   (2006.01)

(52) U.S. Cl. ........................................................ 385/17
(58) Field of Classification Search .................... 385/4, 385/16–18, 33
See application file for complete search history.

(56) References Cited

U.S. PATENT DOCUMENTS

| 6,005,998 | A | 12/1999 | Lee |
| 2002/0057862 | A1 | 5/2002 | Okayama |
| 2002/0090169 | A1 | 7/2002 | Ducellier et al. |
| 2002/0191894 | A1 | 12/2002 | Culver et al. |

FOREIGN PATENT DOCUMENTS

| EP | 1 146 386 A1 | 10/2001 |
| EP | 1 271 201 A1 | 1/2003 |
| EP | 1 271 203 A1 | 1/2003 |
| GB | 2 185 589 A | 7/1987 |

*Primary Examiner*—Quyen Leung
(74) *Attorney, Agent, or Firm*—Workman Nydegger

(57) ABSTRACT

An optical switch comprises an input array of optical elements spaced from an output array of optical elements, means to direct radiation beams and a further array of optical elements optically located between the inputs and outputs, wherein the pitch of the optical elements of said further array of optical elements is inferior to the pitch of the input and/or output array of optical elements.

28 Claims, 7 Drawing Sheets

BEAM STEERING OPTICAL SWITCH

FIELD OF THE INVENTION

The invention relates to the field of optical switches.

BACKGROUND TO THE INVENTION

Conventional optical switches are notoriously difficult to expand without re-engineering.

3D optical switches are typically built with two opposite arrays of beam steering elements where each element of a first array is able to point to any selected element of a second array. Optical characteristics of the beam steering elements impose limits on the working distance between the first and second arrays.

Beam steering elements are usually sufficiently spaced in an array to accommodate their respective motion. A given beam steering element will be limited in terms of its achievable swing for an acceptable level of stability and noise. Increasing the angle of the swing of a given beam steering element is not an effective option since it is likely to cause unwanted noise and instabilities.

One of the objectives of the present invention is to introduce an approach or a series of approaches which allow conventional switch building blocks to be used to increase the capacity of the switch without having to swing at excessive angles, without any significant loss, without having to incorporate higher performance lenses and without having to overall re-engineer the switch.

A particular objective of the present invention is to produce a switch which can be extended without having to incorporate large optical elements with a greater working distance and without having to build the steering arrangements so as to allow larger angles of swing to be performed.

Another particular objective of the present invention is to produce a switch which fulfils both a prior art switching function and simultaneously exploits the optical spaces between conventional optical paths in order to increase the switch's capacity without necessarily extending the working distance.

PRIOR ART KNOWN TO THE APPLICANT(S)

The following background patent documents were identified:
  GB 2 185 589 A (STC plc)
  EP 1 146 386 A8 (International Business Machines Corporation)
  EP 1146386 (IBM)

SUMMARY OF THE INVENTION

In its broadest independent aspect, the invention provides an optical switch, comprising an input array of optical elements spaced from an output array of optical elements, means to direct radiation beams and a further array of optical elements optically located between the inputs and outputs, wherein the pitch of the optical elements of said further array of optical elements is inferior to the pitch of the input and/or output array of optical elements.

This configuration is particularly advantageous because it allows an operator to increase the capacity of an optical switch without necessarily having to increase the area occupied by the input or output ports. For example, if a 16×16 switch were increased by a port traditionally a given collimator would have to be displaceable to a greater degree in order to reach said new port. Using an appropriate array can minimize the required swing of a collimator if placed between the ports to allow a greater length of path between the input and output ports to be achieved. This improvement may also avoid having to entirely re-engineer an existing design to increase the switching capacity. This configuration may also have the benefit of achieving greater compactness of ports.

According to a subsidiary aspect, the array of optical elements is located where the optical paths cross each other. Placing optical elements in these positions provides optimal increase in switch capacity without the array itself having to be overly complex.

In a further subsidiary aspect, the array of optical elements is located in the gaps between where the optical paths cross each other. This allows the switch capacity to be advantageously increased. It may for example allow any gaps between input ports to be filled by additional ports. This will allow better compactness to be achieved.

In a further subsidiary aspect, the further array of optical elements has the primary function of reforming the beams and is placed at a location in the space between the inputs and outputs where reforming the beams allows the achievable optical path length between the input and output arrays to be greater than the optical path length achievable without the further array of elements. This structure also has the benefit of increasing the optical capacity of the switch by increasing the achievable optical length between input and output arrays.

In a further subsidiary aspect, the further array of optical elements is located substantially at a third of the optical path length either from the input array of optical elements or from the output array of optical elements and the pitch of the elements is substantially a third of the pitch of the input/or output array of optical elements. This configuration is particularly advantageous because it increases the optical switching capacity of a given switch without necessarily having to place an array on the centre line of a switch.

In a further subsidiary aspect, a second further array of optical elements is located substantially at a third of the optical path length from the input array of optical elements provided the first further array is located a third of the optical path length from the output of optical elements. Using multiple arrays will have particular benefits in certain applications.

In a further subsidiary aspect, the further array of optical elements is located substantially at a quarter of the optical path length either from the input array of optical element or from the output array of optical elements and the pitch of the elements is substantially a quarter of the pitch of the input and/or output array of optical elements. This amounts to a further advantageous option which could be used for example in a switch where it would not be practical to use a single central array.

In a further subsidiary aspect, the further array of optical elements is a reflective array. This would allow the optical switch capacity to be increased whilst allowing the overall size of a switch incorporating such an array to be adjusted to fit a given set of criteria.

In a further subsidiary aspect, the further array of optical elements is a striped mirror. This also allows the switching capacity to be increased by exploiting the gaps between crossover points. This may be particularly useful when several separate input arrays interact on the same striped mirror array. It may also allow greater compactness to be achieved in an optical switch.

In a further subsidiary aspect, the further array of optical elements is a lenslet array. This feature may allow greater port counts per area to be arrived at.

In a further subsidiary aspect, the further array of optical elements consists of a combination of at least any two of the following elements: striped mirror, lenslet and reflective element.

In a further subsidiary aspect, radiation is inputted and/or outputted to/from the switch via collimators onto an array of tilting mirrors. This may allow switch structures to be extended to larger port counts whilst the switch has a lower specification electronics for a given port count as would be typical in today's art.

In a further subsidiary aspect, the input array incorporates collimators adapted to be displaced in a rocking motion within a given pitch, the optical pitch of the further array of elements being substantially half the pitch of the collimators and the further array of elements being located substantially halfway between the input and output arrays. This structure allows switching to occur with minimal rocking angles so that less mechanical wear occurs on the switch through its life cycle.

In a further subsidiary aspect, the input array incorporates collimators adapted to be displaced in a rocking motion within a given pitch, the optical pitch of the further array of elements being substantially one third of the collimators and the further array of elements being located substantially one third of the optical path length between the input and output array. This form reduces the necessary collimator swing for a given switch capacity.

In a further subsidiary aspect, the input array incorporates collimators adapted to be displaced in a rocking motion within a given pitch, the optical pitch of the further array of elements being substantially one fourth of the collimators and the further array of elements being located substantially one fourth of the optical path length between the input and output array. This also reduces the necessary collimator swing without reducing switch capacity.

BRIEF DESCRIPTION OF THE FIGURES

FIG. 1 (*a*) shows a standard prior art 2×2 switch optical switch.

FIG. 1 (*b*) shows the array of FIG. 1 (*c*) in plan view.

FIG. 1 (*c*) shows a side view of a 16×16 optical switch with four rows of four inputs and four outputs and a reforming lenslet array.

DETAILED DESCRIPTION OF THE DRAWINGS

Figure 1A:
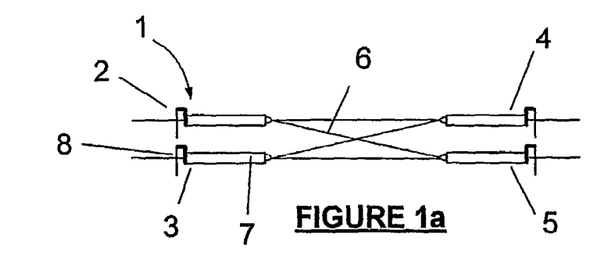

FIG. 1*a* shows an optical switch 1 of standard kind with two input ports respectively referenced 2 and 3 and two output ports respectively referenced 4 and 5. Lines are drawn between the input and output ports which show the possible interconnection lines such as that referenced 6.

Each port may have a collimator 7 attached to a mount 8 which may cause the collimator to displace to effectuate the switching.

Figure 1B:
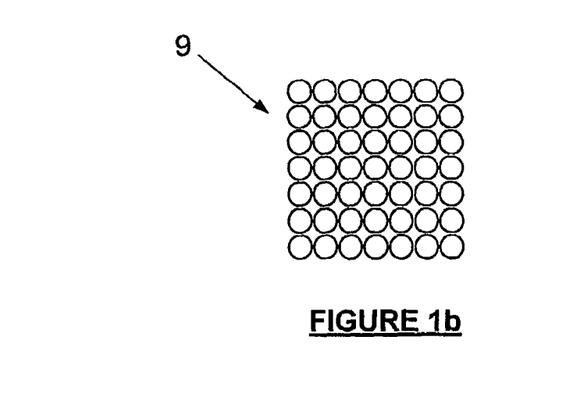
Figure 1C:
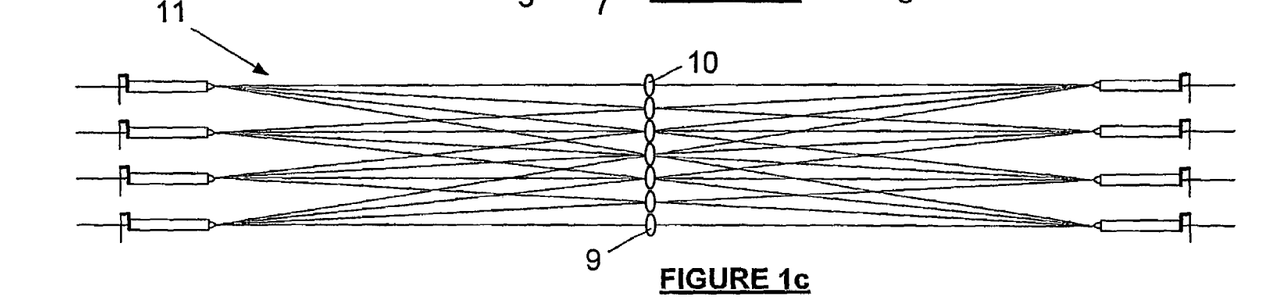

FIG. 1*c* shows an array 9 with lenslets 10 located along the central region of a switch generally referenced 11. The switch has 4 rows of 4 ports on either side of the switch.

From FIG. 1*a* or 1*c*, it can be observed that if all interconnection lines are drawn between two arrays (either a linear or 2d) at most points along the axis between the arrays there is a distribution of beams scattered over the area of the array, but at certain places, especially at the centre, there are only a limited number of points that the beams pass through. The invention proposes to place an array of optical elements at those points where beams cross each other.

The array 9 may be formed of lenslets 10 as shown in FIG. 1*b* which could be set to reform the beams, giving longer working length from the same collimators (The maximum gain in working distance being set by the beam diameter approaching the pitch of the array). This limit typically allows paths up to four times longer than in the original switch, which may give a 16 fold increase in port count for a 2D array. The elements can be refractive or reflective depending on the configuration desired.

The pitch of the array of FIG. 1*c* is exactly half the pitch of the optical pivot points. The optical pivot points lie at the mount or flexures which support the collimators or alternatively if the input ports use MEMs, they would lie at the mirrors.

For a 2D array, such as FIG. 1*b*, the horizontal pitch is half the horizontal optical pivot pitch and the vertical pitch half the vertical optical pivot pitch.

Figure 2:
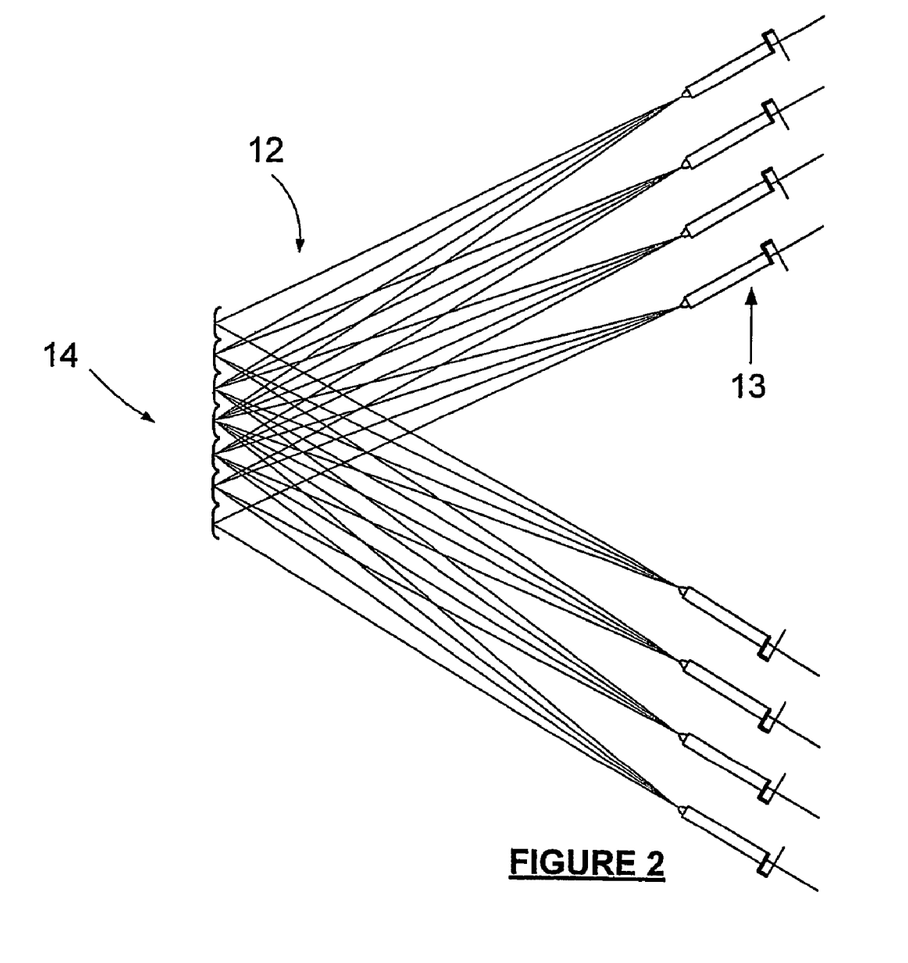
FIG. 2 shows a reflective optical switch according to the present invention.

A so-called skewed reflective system is shown in FIG. 2, where a first set of rocking collimators are used to input the beam onto the reflective array which reflects the beams towards a second set of rocking collimator which are located underneath the first set. This reflective system allows the switch to be folded.

In the particular switch generally referenced 12 sketched in FIG. 2, all the pivot points (such as that referenced 13) of both first and second set of collimator arrays, all line up in a straight line which simplifies design and construction. The reflective array 14 is designed to have a pitch which is half the pivot pitch.

Figure 3:
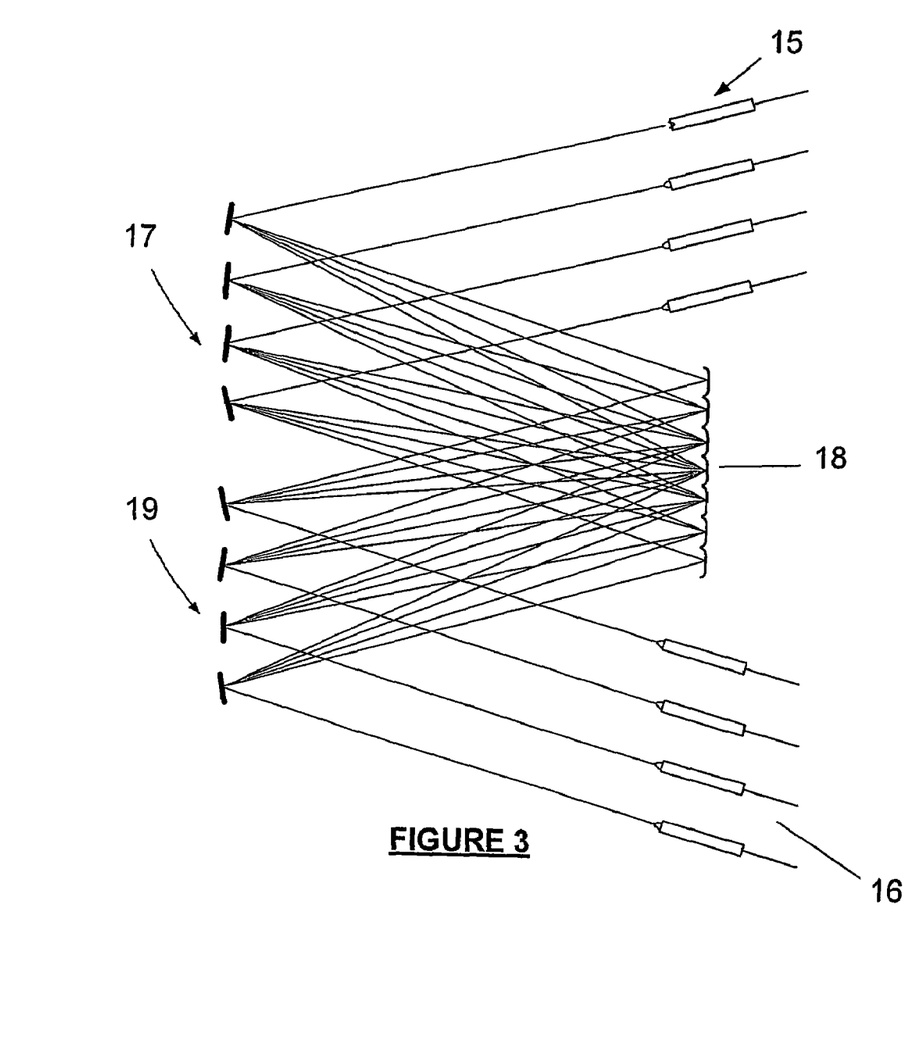
FIG. 3 shows an optical switch with tilting mirrors according to the present invention.

FIG. 3 shows a first and second set of collimator arrays respectively referenced 15 and 16. The beams emitted by the collimators 15 are transmitted onto a first tilting mirror array 17 which reflects the beam onto a reflective array 18 and then onto a second tilting mirror array 19 and then onto collimators 16. The collimators are placed in the same plane as the reflective array. The switch of FIG. 3 serves as a 16×16 MEMs switch provided there are 4 rows of the kind shown in the figure.

The inventive approach allows any switch structure to appear to have its collimator spacing set by the maximum desired crosstalk, independent of other engineering considerations which end up having to have them further apart. In a single mode system, the radius of curvature of the concave mirror lenslet simply needs to be set to match that of the Gaussian beam arriving at the lenslet. If a refractive array is used in transmission, the focal lengths of the lenslets are the same as that of the concave mirrors ½×radius of curvature of the Gaussian beam.

Figure 4:
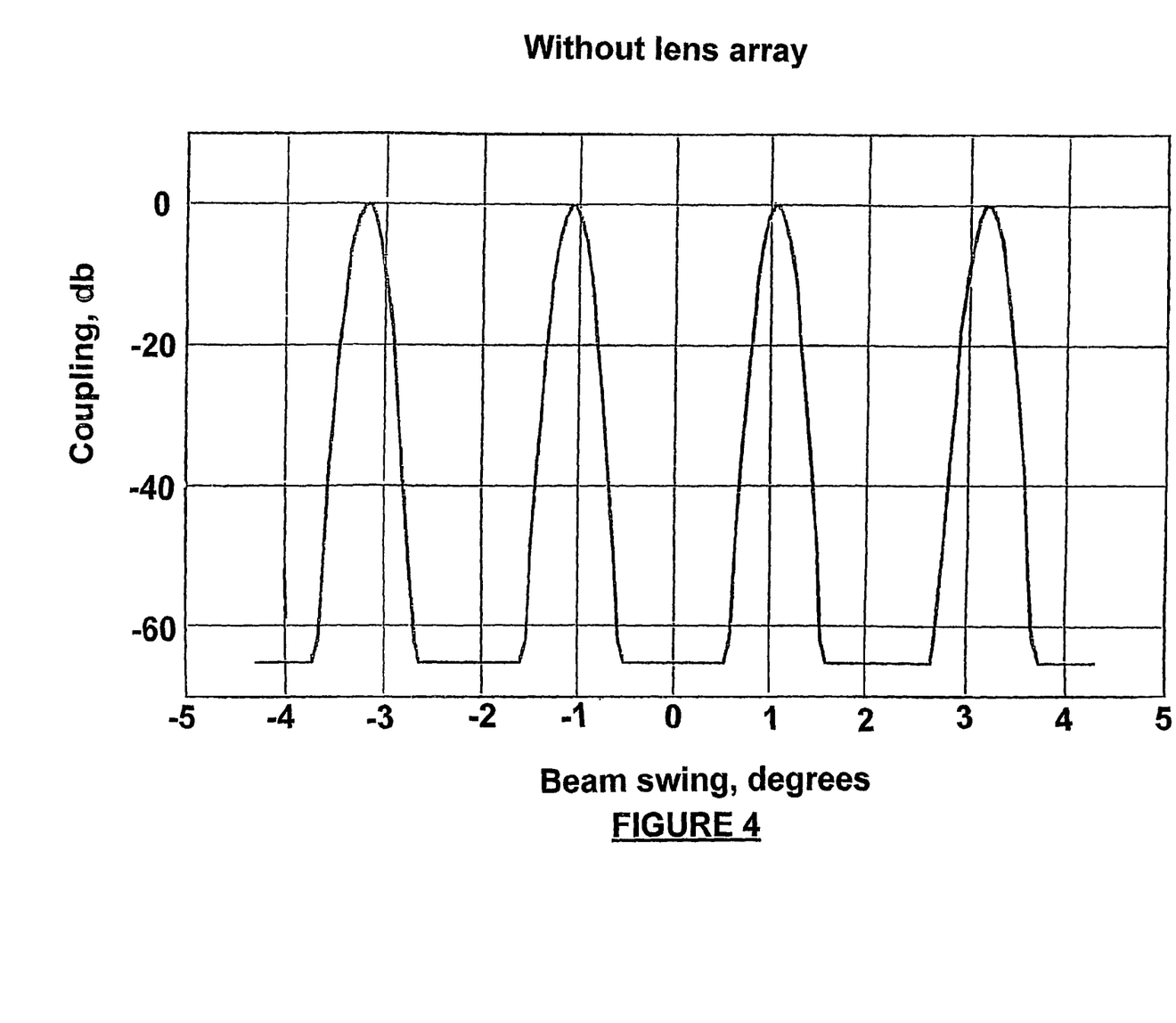
FIG. 4 shows performance results of an optical switch without an optical array according to invention.
Figure 5:
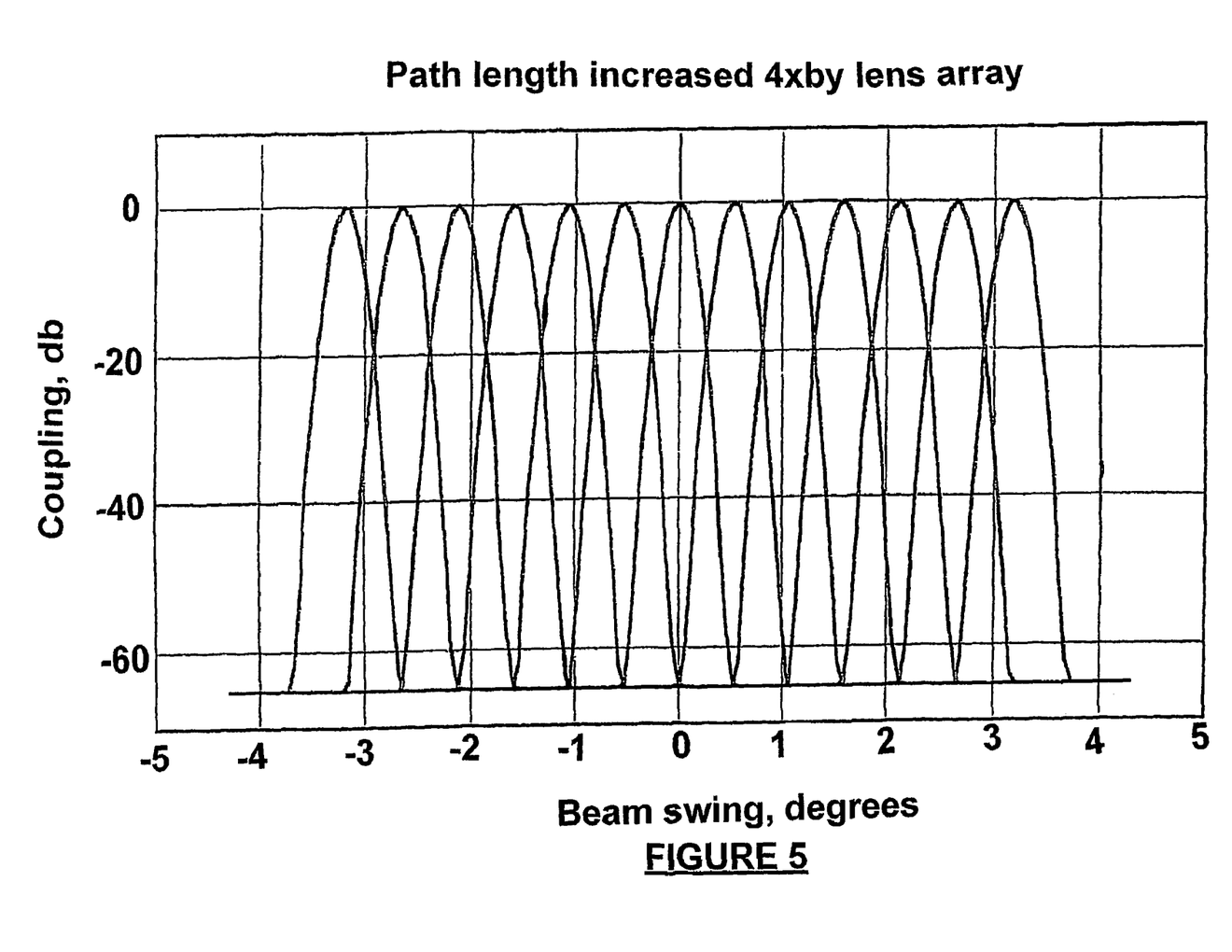
FIG. 5 shows performance results of an optical switch with an optical array according to the invention.

FIG. 4 and FIG. 5 contrast a switch without the inventive array and a switch incorporating the inventive array.

In FIG. 4 the parameters are: coupling in db for single axis misalignment, single mode Gaussian beams, $Z_o$=50 mm, 1550 nm, into 4 wide array, pivot pitch 4.5 mm, pivot separation 120 mm, optical path 100 mm.

In FIG. 5, the parameters are as per those in FIG. 4 except 13 wide array, same pitch, pivot separation 480 mm, optical path 460 mm, 100 mm focal length, 2.25 mm pitch lenslet array in centre of optical path. When assessing the axis of performance vs angle, similar or identical values are achieved (crosstalk 60 db). (Actual devices achieve better than 50 db crosstalk from single end misalignment, approaching 100 db with both ends misaligned, i.e. pointing at adjacent collimator).

The inventive approach may be applied to both single mode and multimode systems. In multimode systems it has the added benefit of permitting 1:1 imaging of the fibre cores, rather than exchanging position and na between the fibres as in a standard pair of collimators. This gives the advantage of flexibility of working distance (via changing the focal length of the array) without having to change the collimating lenses.

Instead of necessarily placing an array at a position to exploit the fact that beams cross over in order to increase switch capacity, the invention also proposes to increase switch capacity by placing elements where the beams do not traditional pass through. This may be achieved by array interleaving.

Figure 6:
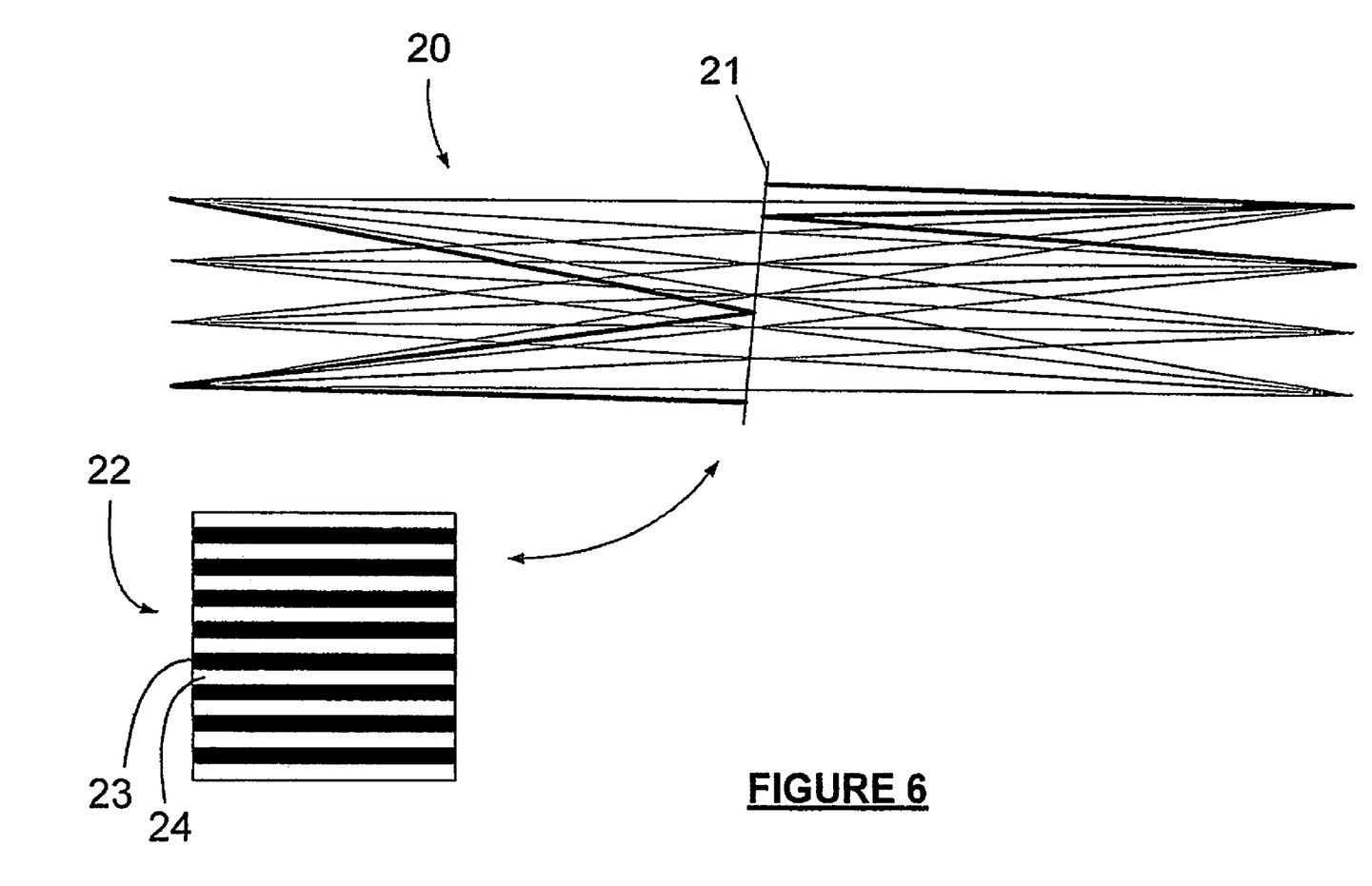
FIG. 6 shows an optical switch with a striped mirror array.

Array interleaving exploits the gaps between beams. This may be achieved by placing a so-called striped mirror 21 between the crossing points in a switch such as that referenced 20 in the figure. The actual beam steering arrangements have been replaced by points in order to simplify the figure. Next to the illustration of the switch is presented in plan view a striped mirror array 22 which is an illustration of striped mirror 21 of the switch. This array has alternatively located gold plated reflective strips such as that referenced 23 and clear stripes such as that referenced 24. The plating may be reflective on both sides of the array.

Figure 7:
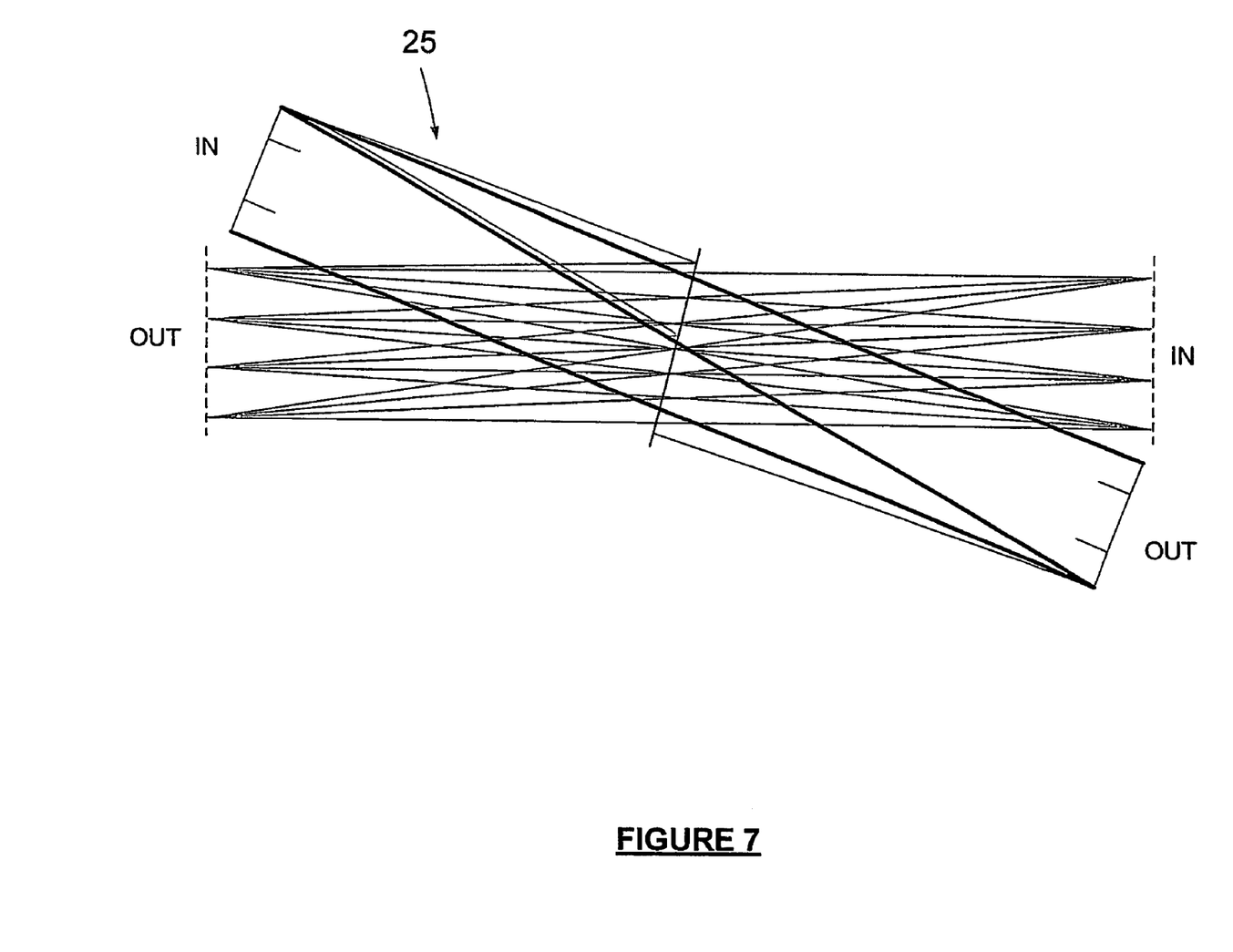
FIG. 7 shows a further embodiment of an optical switch with a striped mirror array.

The array may be so sized, positioned and shaped so that at the crossing point, the beams pass across the array from one port to the other. When the beams are directed onto a mirror stripe, it reflects the light towards a further port. Ports specifically equipped to receive these reflected beams may be placed between the input array ports or in a separate array as appropriate (both of these structures are shown in FIG. 6 and FIG. 7 respectively).

FIG. 6 shows a 32 way reflective system generally referenced 20 in plan or side view set up with 148 mm between pivot points, 5.5 mm pitch flexures, tilt 1.06 degree nom and Gaussian beam 1/e diameter at centre of 0.4 mm. The mirror was silvered in 1.375 mm stripes, 2.75 mm pitch and AR coated both sides.

The mirror stripes may be tilted at a small angle so that the image of collimators in the originating array may be reflected towards the gaps between collimators of a target array. The darker line of the left hand side of the switch shows the path of a beam emitted from a collimator (not shown) and meeting a striped mirror portion of the array which reflect the beam onto a further collimator of the left hand side of the switch. The lighter lines are conventional paths which intersect with the array at portion of the array which are not mirrored but adapted to allow the beam to cross to the right hand side of the array.

The stripes on the mirrors may be at a pitch of half the optical pivot point pitch; hence the reflector width and gap width are both ¼ of the pivot point pitch.

Alternatively the mirror stripes can be tilted further, and two extra arrays used, to give eg. a 32×32 switch from four 16 way arrays as shown in FIG. 7, eg. collimator pitch 5.5 mm, end to end path length (pivot point to pivot point) 150 mm, mirror tilt 7.45 degree nom.

The paths illustrated in a darker colour are paths which traverse the array between the mirror portions of the array. The light paths associated with these darker paths meet the array on a mirrored stripe and are therefore reflected back. Other lighter paths traverse the array.

A technique which gives greater tolerancing in the optical element positioning (or capability of handling larger beam diameters is to use a diagonal checker board array of reflective and transmissive elements. This gives a reflective or transmissive patch size of 1 over two times root two (1/2.81) of the pivot pitch, and requires the element to be mounted at a small angle in both axes to image the collimator arrays properly. These approaches do not change the apparent distance between the arrays, but interleave their images.

The invention claimed is:

1. An optical switch, comprising:
   an input array and an output array of optical elements;
   a space between the input and output array, whereby said input array of optical elements is spaced from said output array;
   means for directing radiation beams; and a further array of optical elements optically located between said input and output arrays;
   wherein the pitch of the optical elements of said further array of optical elements is inferior to the pitch of at least one of said input array and said output array; and
   said further array of optical elements is a reflective array.

2. A switch according to claim 1, wherein said further array of optical elements is located where optical paths cross each other.

3. A switch according to claim 1, wherein said further array of optical elements is located in the gaps between where the optical paths cross each other.

4. A switch according to claim 1, wherein radiation is inputted to the switch via collimators onto an array of tilting mirrors.

5. An optical switch, comprising:
   an input array and an output array of optical elements;
   a space between the input and output array, whereby said input array of optical elements is spaced from said output array;
   means for directing radiation beams; and
   a further array of optical elements optically located between said input and output arrays;
   wherein the pitch of the optical elements of said further array of optical elements is inferior to the pitch of at least one of said input array and said output array; and
   said further array of optical elements is a striped mirror.

6. A switch according to claim 5, wherein said further array of optical elements is located where optical paths cross each other.

7. A switch according to claim 5, wherein said further array of optical elements is located in the gaps between where the optical paths cross each other.

8. A switch according to claim 5, wherein radiation is inputted to the switch via collimators onto an array of tilting mirrors.

9. An optical switch, comprising:
   an input array and an output array of optical elements;
   a space between the input and output array, whereby said input array of optical elements is spaced from said output array;
   means for directing radiation beams; and
   a further array of optical elements optically located between said input and output arrays;

wherein the pitch of the optical elements of said further array of optical elements is inferior to the pitch of at least one of said input array and said output array; and said further array of optical elements consists of a combination of at least any two of the following elements: striped mirror, lenslet and reflective element.

10. A switch according to claim 9, wherein said further array of optical elements is located where optical paths cross each other.

11. A switch according to claim 9, wherein said further array of optical elements is located in the gaps between where the optical paths cross each other.

12. A switch according to claim 9, wherein radiation is inputted to the switch via collimators onto an array of tilting mirrors.

13. An optical switch, comprising:
an input array and an output array of optical elements;
a space between the input and output array, whereby said input array of optical elements is spaced from said output array;
means for directing radiation beams; and
a further array of optical elements optically located between said input and output arrays;
wherein the pitch of the optical elements of said further array of optical elements is inferior to the pitch of at least one of said input array and said output array; and
wherein the input array incorporates collimators adapted to be displaced in a rocking motion within a given pitch, the optical pitch of the further array of elements being substantially half the pitch of the collimators and the further array of elements being located substantially halfway between the input and output array.

14. A switch according to claim 13, wherein said further array of optical elements has the primary function of reforming the beams and is placed at a location in said space between the inputs and outputs where reforming the beams allows the achievable optical path length between the input and output arrays to be greater than the optical path length achievable without said further array of elements.

15. An optical switch, comprising:
an input array and an output array of optical elements;
a space between the input and output array, whereby said input array of optical elements is spaced from said output array;
means for directing radiation beams; and
a further array of optical elements optically located between said input and output arrays;
wherein the pitch of the optical elements of said further array of optical elements is inferior to the pitch of at least one of said input array and said output array; and
wherein the input array incorporates collimators adapted to be displaced in a rocking motion within a given pitch, the optical pitch of the further array of elements being substantially one third of the collimators and the further array of elements being located substantially one third of the optical path length between the input and output array.

16. A switch according to claim 15, wherein said further array of optical elements has the primary function of reforming the beams and is placed at a location in said space between the inputs and outputs where reforming the beams allows the achievable optical path length between the input and output arrays to be greater than the optical path length achievable without said further array of elements.

17. An optical switch, comprising:
an input array and an output array of optical elements;
a space between the input and output array, whereby said input array of optical elements is spaced from said output array;
means for directing radiation beams; and
a further array of optical elements optically located between said input and output arrays;
wherein the pitch of the optical elements of said further array of optical elements is inferior to the pitch of at least one of said input array and said output array; and
wherein the input array incorporates collimators adapted to be displaced in a rocking motion within a given pitch, the optical pitch of the further array of elements being substantially one fourth of the collimators and the further array of elements being located substantially one fourth of the optical path length between the input and output array.

18. A switch according to claim 17, wherein said further array of optical elements has the primary function of reforming the beams and is placed at a location in said space between the inputs and outputs where reforming the beams allows the achievable optical path length between the input and output arrays to be greater than the optical path length achievable without said further array of elements.

19. An optical switch, comprising an input array of moveable beam steering arrangements; an output array of moveable beam steering arrangements; and a passive array of optical elements optically located between said input and output arrays of moveable beam steering arrangements; wherein the pitch of said passive array is inferior to the pitch of said input and output arrays; and said input and output arrays incorporate moveable collimators which directly communicate with individual elements of said passive array.

20. A switch according to claim 19, wherein said passive array of optical elements is located substantially at the centre of the space between the input and output arrays of moveable collimators and the pitch of the elements is substantially half the pitch of the arrangements of the input and output arrays.

21. A switch according to claim 19, wherein said passive array of optical elements is located substantially at a third of the optical path length from at least one of said input array and said output array and the pitch of the elements is substantially a third of the pitch of said array of beam steering arrangements.

22. A switch according to claim 19, wherein a second passive array of optical elements is located substantially at a third of the optical path length from the input array provided said first passive array is located a third of the optical path length from the output of optical elements.

23. A switch according to claim 19, wherein said passive array of optical elements is located substantially at a quarter of the optical path length from at least one of said input array and said output array and the pitch of the elements is substantially a quarter of the pitch of said array of beam steering arrangements.

24. A switch according to claim 19, wherein said further array of optical elements is a reflective array.

25. A switch according to claim 19, wherein said further array of optical elements is a striped mirror.

26. A switch according to claim 19, wherein said further array of optical elements is a lenslet array.

27. A switch according to claim 19, wherein said further array of optical elements consists of a combination of at least any two of the following elements: striped mirror, lenslet and reflective element.

28. A switch according to claim 19, wherein radiation is inputted to the switch via collimators onto an array of tilting mirrors.

* * * * *